E. Wright.
Let-off Mechanism for Loom.

№ 72769      Patented Dec. 31, 1867.

WITNESSES.
Thos. H. Dodge
D. L. Miller.

INVENTOR.
Edward Wright.

United States Patent Office.

EDWARD WRIGHT, OF WORCESTER, MASSACHUSETTS, ASSIGNOR TO L. J. KNOWLES & BROTHER, OF SAME PLACE.

Letters Patent No. 72,769, dated December 31, 1867.

IMPROVEMENT IN LET-OFF MECHANISM FOR LOOMS.

The Schedule referred to in these Letters Patent and making part of the same.

KNOW ALL MEN BY THESE PRESENTS:

That I, EDWARD WRIGHT, of the city and county of Worcester, and Commonwealth of Massachusetts, have invented certain new and useful Improvements in Let-Off Motions for Looms, of which the following is a full, clear, and exact description, reference being had to the accompanying drawings, forming a part of this specification, in which—

Figures 1, 2, 3:
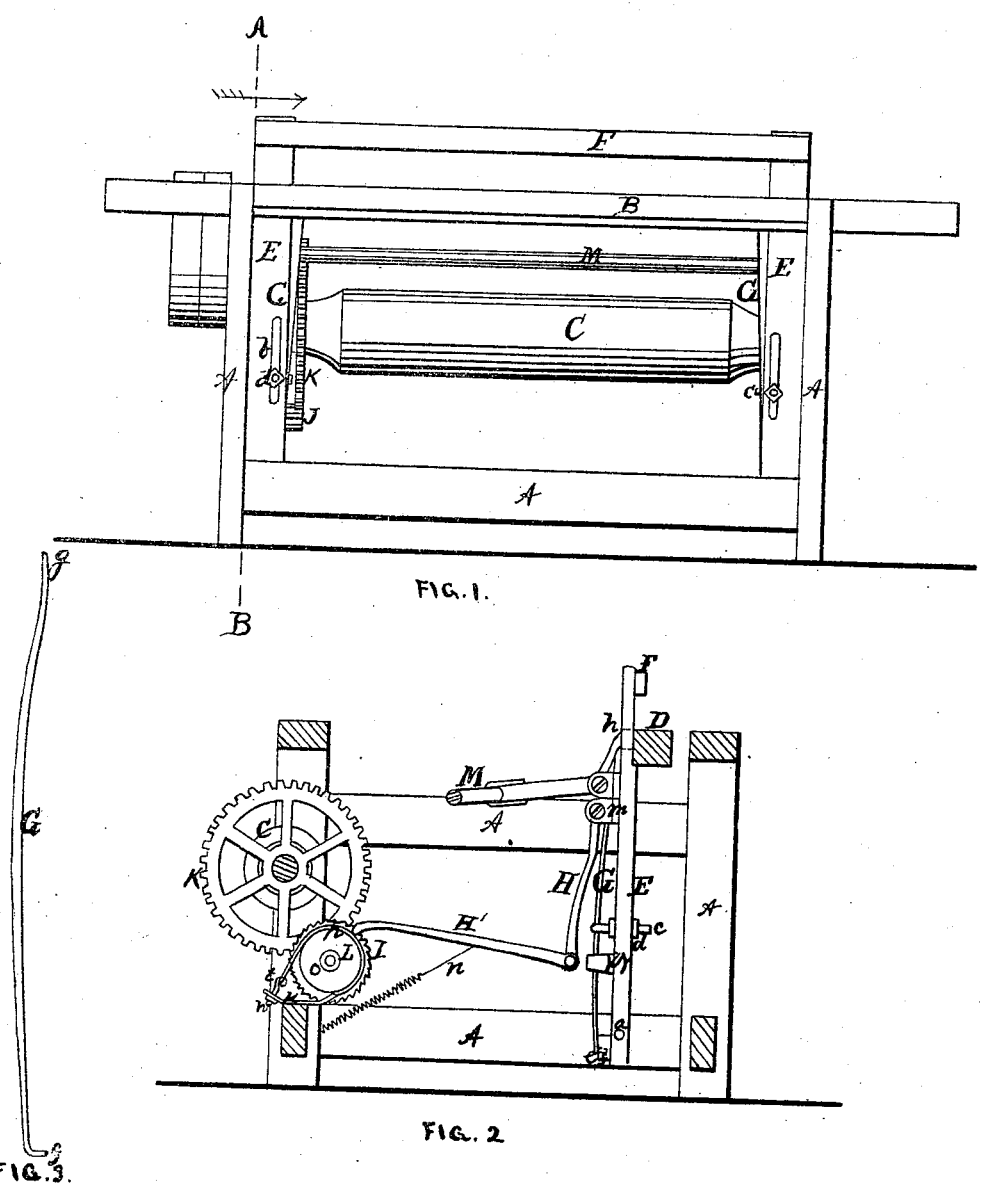
Figure 1 represents a front view of so much of a loom as is necessary to illustrate my present improvements.
Figure 2 represents a section on line A B, fig. 1.
Figure 3 represents an edge view of the spring which holds the bottom of the reed in place, as will be more fully explained hereafter.

To enable those skilled in the art to which my invention belongs to make and use the same, I will proceed to describe it more in detail.

In the drawings, the parts marked A A A A represent the main frame of the loom, B the breast-beam, and C the yarn-beam. D is the lay, the legs E E of which are hinged or journalled to the lower side pieces of the frame, as shown at $a$. F is the hand-piece attached to the upper ends of legs E E. The legs E E are slotted out, as seen at $b\ b$, and hooked-headed bolts, $c\ c$, inserted with nuts, $d\ d$, as shown in the drawing. To the bottom of the legs E E are fastened pieces, $e$, provided with notches to receive the lower hooked ends $f$ of springs G G, which pass up through the hooks of bolts $c\ c$, and bear, with their upper ends $g$, against the movable mouth-piece $h$, which holds the bottom of the reed in place in the lay. To one of the legs E is fastened an ear-piece, $m$, to which is hinged the lever H, the lower end of which is hinged to the dog or pawl H', which is held down upon the ratchet-wheel I by a spring, $n$. Upon the shaft $o$ of the ratchet-wheel I is a cog-wheel, J, which takes into cog-wheel K on the shaft of the yarn-beam C. A friction-wheel, L, is attached to the side of the ratchet-wheel or its shaft, and around which friction-wheel is passed a friction-strap, $p$, one end of which is connected to a bolt, $t$, which passes through a plate or strap, $u$, and is provided with a nut, $w$, whereby the friction upon wheel L can be regulated at pleasure. The lay of the loom is operated from crank-shaft M in the usual manner. A guide and feed-finger or projection, N, is attached to the leg of the lay, next to lever H, and dog or pawl H', to prevent the spring G on that side from slipping into the path of said lever and dog or pawl, and also to force the dog or pawl H' back to operate and move the ratchet-wheel I, at each back-motion of the lay of the loom.

The operation is as follows: When the reed strikes the thread of filling, and forces it forward against the woven cloth, the bottom of the reed is forced back, which, in turn, forces the movable mouth-piece and the upper end of lever H back, thereby throwing the lower end of the latter and dog or pawl H' forward, thus allowing the spring $n$ to draw down the free end of pawl H' past one or more of the teeth on ratchet-wheel I, so that when the lay swings back, the feed-finger or projection N forces the pawl H' back to its original position, and thus causes the ratchet-wheel I, and cog-wheels J and K, to move and turn the yarn-beam to unwind or let off the warp-threads thereon. The let-off mechanism can be adjusted to let off the yarn faster or slower by means of the hooked-headed bolts $c$. If their nuts are turned so as to draw springs G G up towards the legs of the lay, it requires greater force to throw back the movable mouth-piece, against which the upper ends of springs G G bear, and consequently the cloth will be firmer than when the bolts $c\ c$ are set so that it requires but little force to throw back the mouth-piece, against which the upper end of lever H rests. By making the springs G G thinner at each end, or with double tapers, there is a greater elasticity and uniformity of action obtained in the let-off motion, than could be obtained with springs tapering only from the bottom to the top. Bolts $c\ c$ have check-nuts arranged upon them, between the springs G G and legs E E, whereby said bolts can be moved up and down in the slots $b\ b$, and then securely fastened in place. By moving bolts $c\ c$ up in slots $b\ b$ the action of the let-off is somewhat retarded, while, if the bolts are lowered, the action is increased. The adjustment of the let-off motion can therefore be effected either by raising and lowering the bolts or by drawing them further into the legs E E, as before explained.

Having described my improved let-off motion for looms, what I claim therein as new and of my invention, and desire to secure by Letters Patent, is—

The combination, with the pawl and lever and springs G, of the guide and feed-finger N, mounted upon the lay, substantially in the manner and for the purposes set forth.

EDWARD WRIGHT.

Witnesses:
THOS. H. DODGE,
D. L. MILLER.